(12) United States Patent
Mackiewicz

(10) Patent No.: US 6,241,369 B1
(45) Date of Patent: Jun. 5, 2001

(54) QUICK MOUNT FIXTURE

(75) Inventor: Edwin Thomas Mackiewicz, Chicago, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/196,785

(22) Filed: Nov. 20, 1998

(51) Int. Cl.[7] .................................................. F21V 21/02
(52) U.S. Cl. ............................ 362/368; 362/31; 362/388; 362/147; 40/546
(58) Field of Search ............................... 40/546, 570, 572, 40/574; 362/31, 147, 226, 368, 370, 371, 388, 432; 439/335, 336, 342, 343, 536, 537, 558, 564, 638, 650, 651, 652, 692, 695, 686, 682, 701, 702

(56) References Cited

U.S. PATENT DOCUMENTS

| | | | |
|---|---|---|---|
| 2,578,008 | 12/1951 | Judd | 24/243 |
| 2,639,311 * | 5/1953 | Cook | 439/558 |
| 2,994,148 * | 8/1961 | Endelson | 362/31 |
| 3,798,584 * | 3/1974 | Person | 439/537 |
| 3,931,689 * | 1/1976 | Shine | 40/570 |
| 4,385,343 * | 5/1983 | Plumly | 362/31 |
| 4,415,217 * | 11/1983 | Clabburn et al. | 439/651 |
| 5,027,258 * | 6/1991 | Schoniger et al. | 362/31 |
| 5,102,275 | 4/1992 | Hulsey | 411/134 |
| 5,138,116 | 8/1992 | Kabayama | 174/138 |
| 5,190,365 * | 3/1993 | Cordy, Jr. | 362/31 |
| 5,207,535 | 5/1993 | Saab | 405/269.1 |
| 5,239,450 * | 8/1993 | Wall | 362/31 |
| 5,267,404 | 12/1993 | Kizy | 40/545 |
| 5,272,605 | 12/1993 | Johnstone | 362/147 |
| 5,376,020 | 12/1994 | Jones | 439/537 |
| 5,526,251 | 6/1996 | Andre et al. | 362/396 |
| 5,640,792 | 6/1997 | Smith et al. | 40/546 |
| 5,735,498 | 4/1998 | Jue et al. | 248/222.12 |

* cited by examiner

*Primary Examiner*—Alan Cariaso
(74) *Attorney, Agent, or Firm*—Fish & Richardson PC

(57) ABSTRACT

A fixture, such as a light fixture includes a housing and a mounting base having a connector. The housing includes a first mating connector positioned on an end of the housing to permit attachment of the housing to the mounting base with the end of the housing adjacent to the mounting base, a second mating connector positioned on a side of the housing to permit attachment of the housing to the mounting base with the side of the housing adjacent to the mounting base, and a third mating connector positioned on a top of the housing to permit attachment of the housing to the mounting base with the top of the housing adjacent to the mounting base. A lens panel extends from the bottom of the fixture.

30 Claims, 19 Drawing Sheets

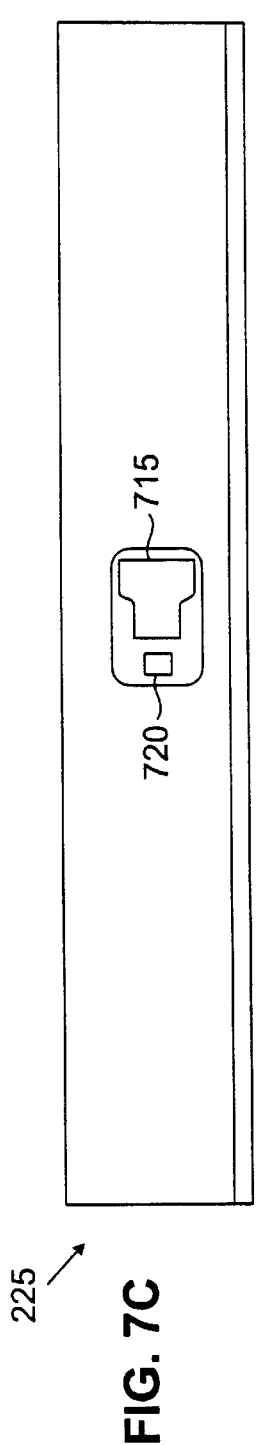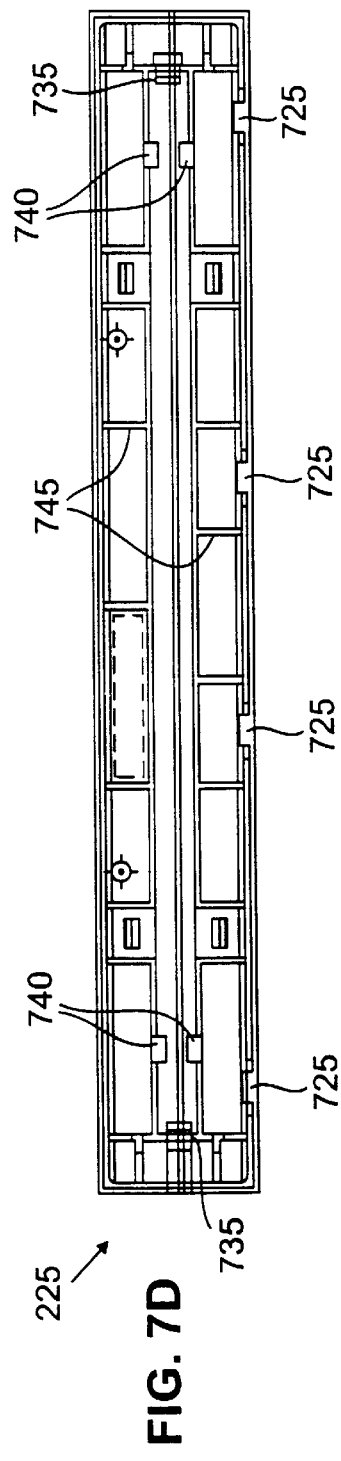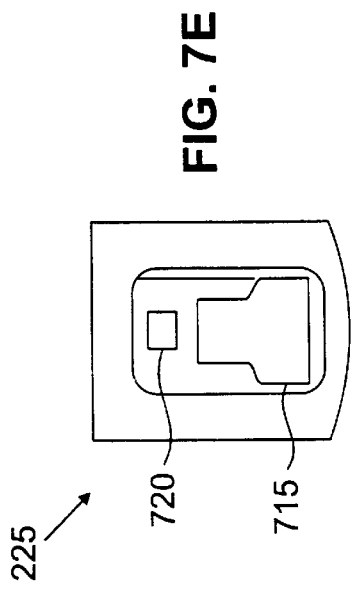

QUICK MOUNT FIXTURE

TECHNICAL FIELD

This invention relates to mounting fixtures on walls or ceilings.

BACKGROUND

Fixtures, such as those associated with lighted exit signs, may be mounted on a wall or on a ceiling. Ceiling-mounted fixtures generally attach to the top of a sign and position the sign perpendicularly to the ceiling. Wall-mounted fixtures may attach to the side of a sign to position the sign parallel to the wall, or may attach to the end of the sign to position the sign perpendicularly to the wall.

In one general aspect, a fixture includes a mounting unit and a housing unit. The mounting unit includes attachment points for attachment to a junction box, and also includes a connector. The housing unit includes at least two mating connectors positioned at different locations for attachment to the housing. The housing unit is connected to a lens panel at an edge of the lens panel defined between two display faces of the panel. A light source positioned in the housing unit directs light into the lens panel along the edge.

Embodiments may include one or more of the following features. For example, a first mating connector may be positioned at the end of the housing unit to enable the housing unit to be mounted perpendicularly to the mounting unit. A second mating connector may be positioned on the side of the housing unit to enable the housing unit to be mounted parallel to the mounting unit. A third mating connector may be positioned on the top of the housing unit to enable the housing unit to be mounted beneath the mounting unit.

The lens panel, such as an exit sign, may be attached to the bottom of the housing unit. The light source may include a set of LEDs. The lens panel may include reflective material in its center and along edges other than the connection edge to improve illumination of the lens panel.

The housing unit may include a housing body and a housing cover, with the housing cover including one of the mating connectors. Plugs, which may provide a surface flush with the housing base or the housing cover may be attached to the unused mating connectors. The connector may include a locking mechanism.

The connector may include a female connector and a male connector. The female connector includes two holes, and the male connector includes a raised portion and a locking bar. When the connectors are joined together, the raised portion of the male connector fits in the first hole of the female connector and the housing unit is moved so that the locking bar engages the second hole and ensures a secure, locked, connection between the connectors.

The mounting unit may include a mounting base and a canopy, with the mounting base attaching to the junction box and the canopy including the connector for attachment to the housing unit.

The invention provides a single, adaptable lighted fixture that can be used to direct light into an edge of a sign, such as a lighted exit sign, and to mount the sign on a ceiling or a wall. When the exit sign is mounted on a wall, the sign can be end-mounted so that it protrudes perpendicularly to the wall. The sign may also be mounted so that it is parallel to the wall.

Other features and advantages will be apparent from the following description, including the drawings, and from the claims.

DESCRIPTION OF DRAWINGS

FIGS. 7B–7E are bottom, side, top, and end views of the housing of FIG. 7A.

DETAILED DESCRIPTION

Figure 1:
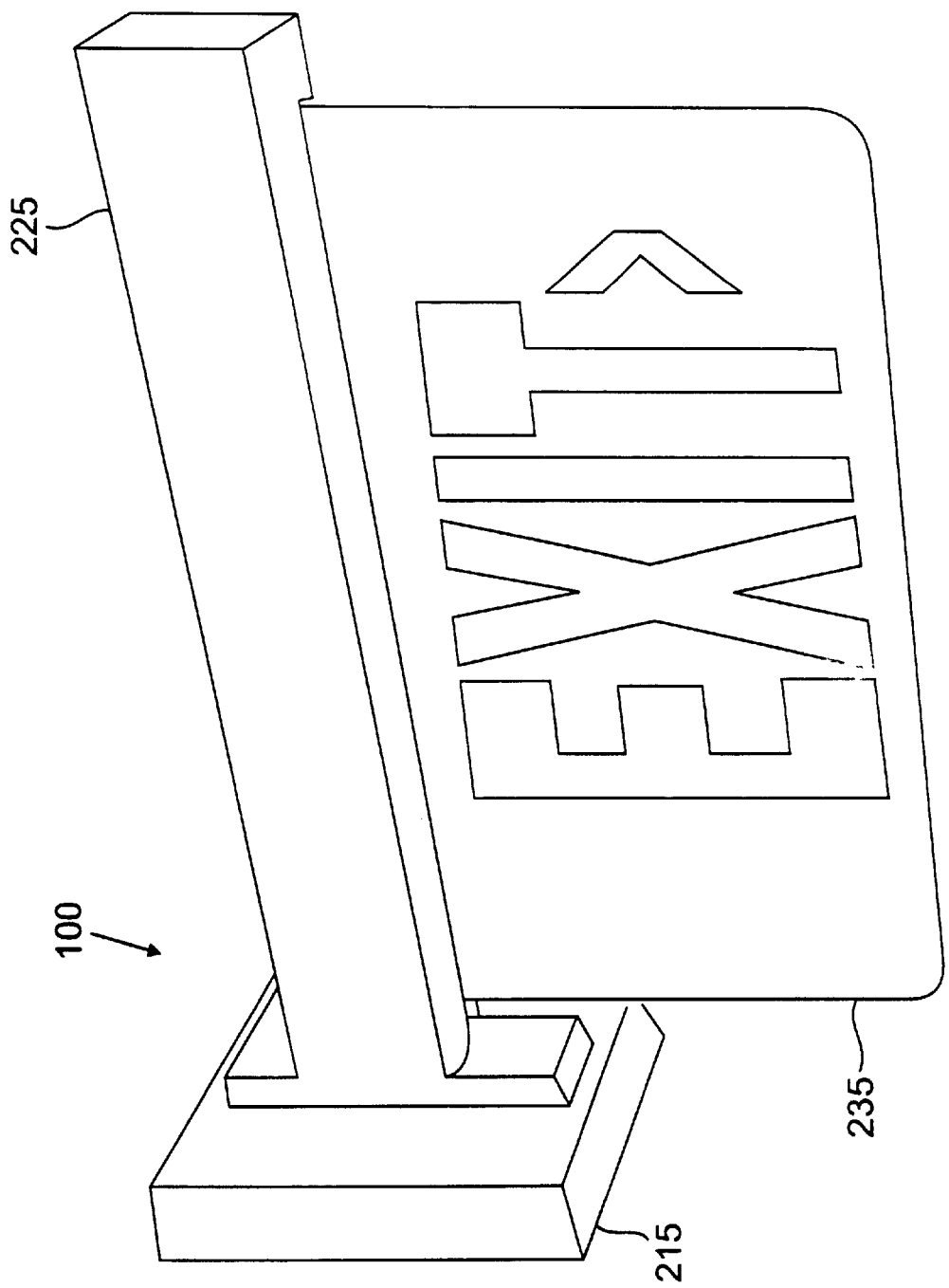
FIG. 1 is a perspective view of an exit fixture oriented to position an exit sign perpendicularly to a wall.
Figure 2:
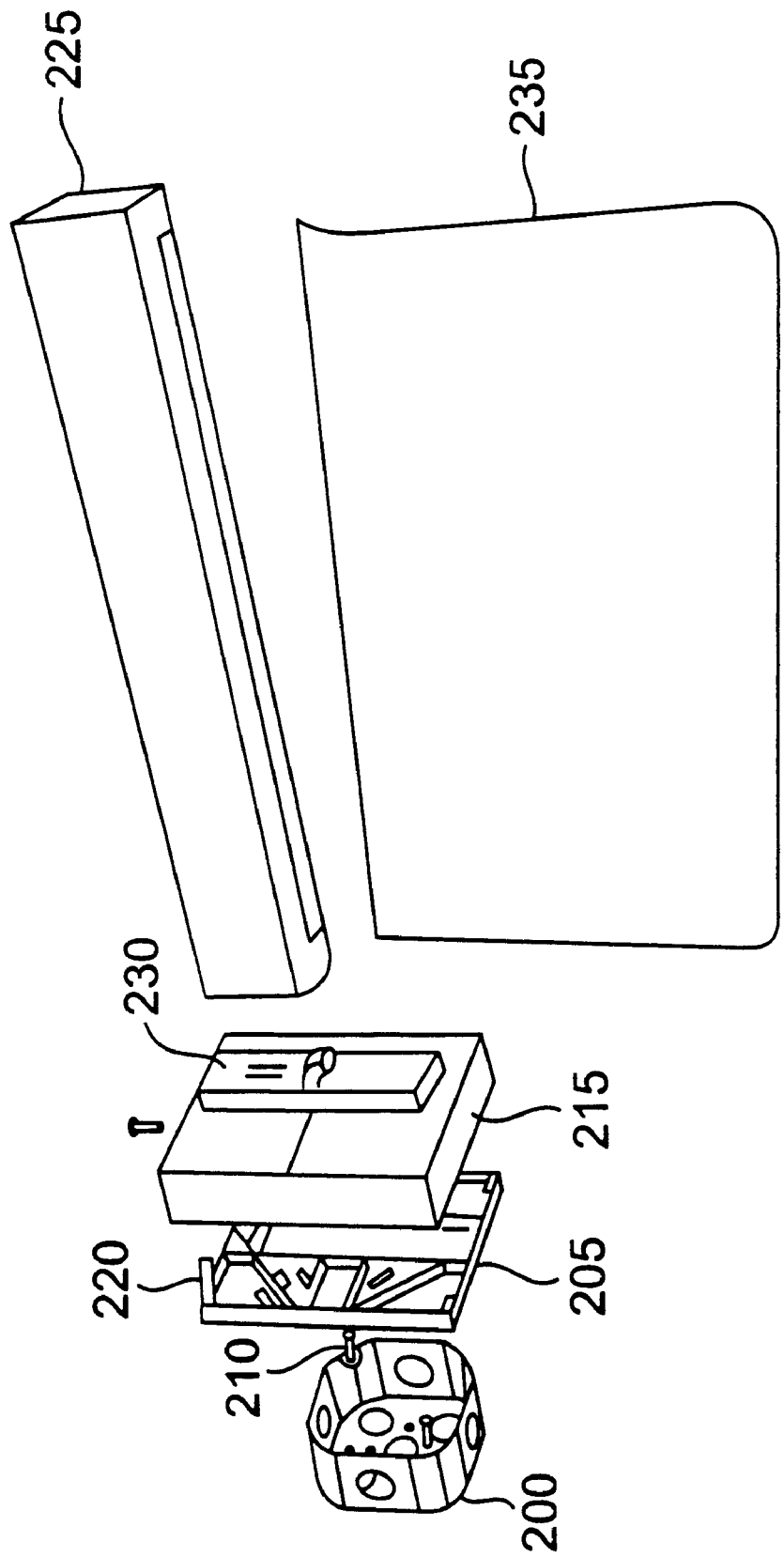
FIG. 2 is an exploded view of the fixture of FIG. 1.
Figure 3:
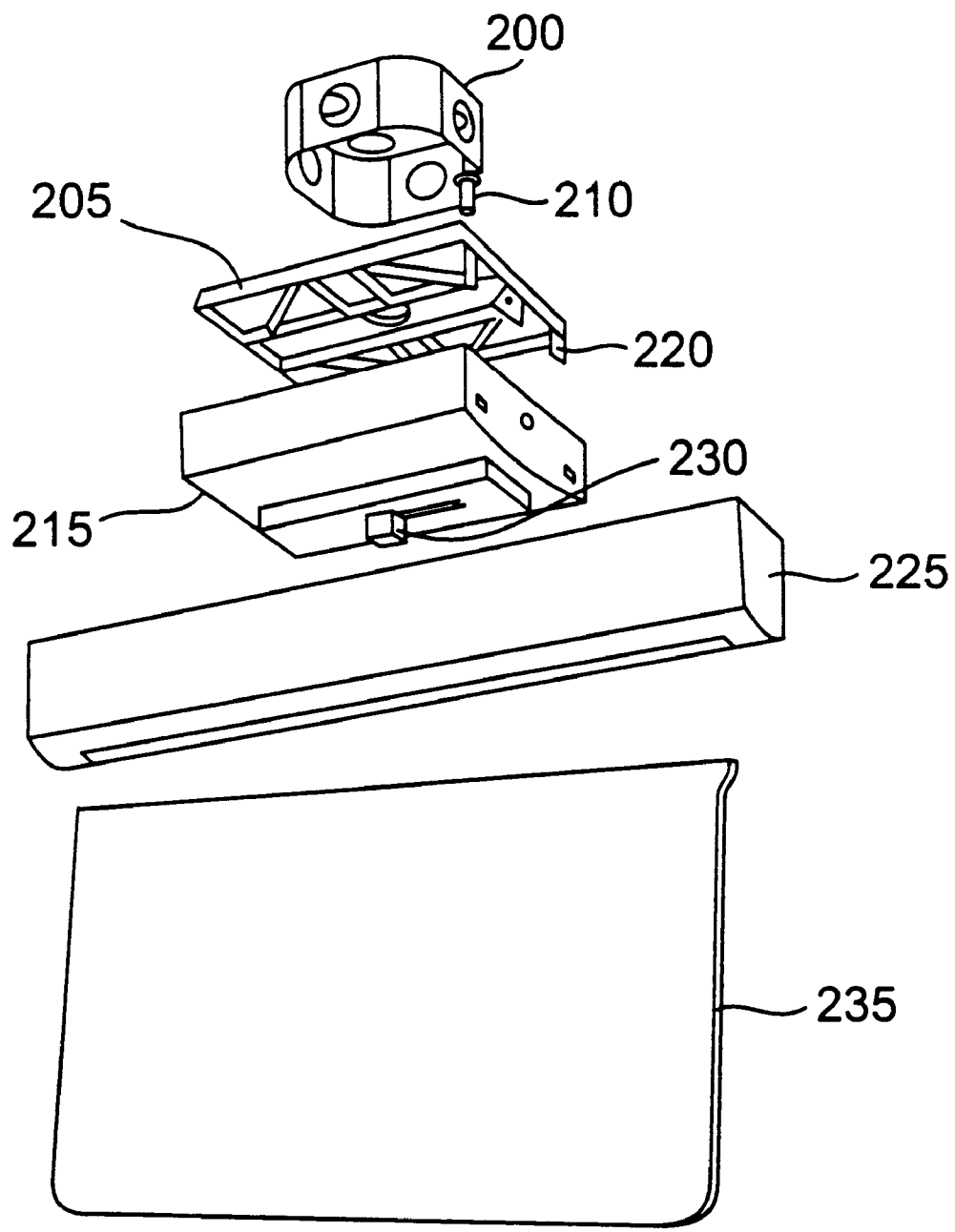
FIG. 3 is an exploded view of the fixture of FIG. 1 oriented to position the sign perpendicularly to a ceiling.
Figure 4:
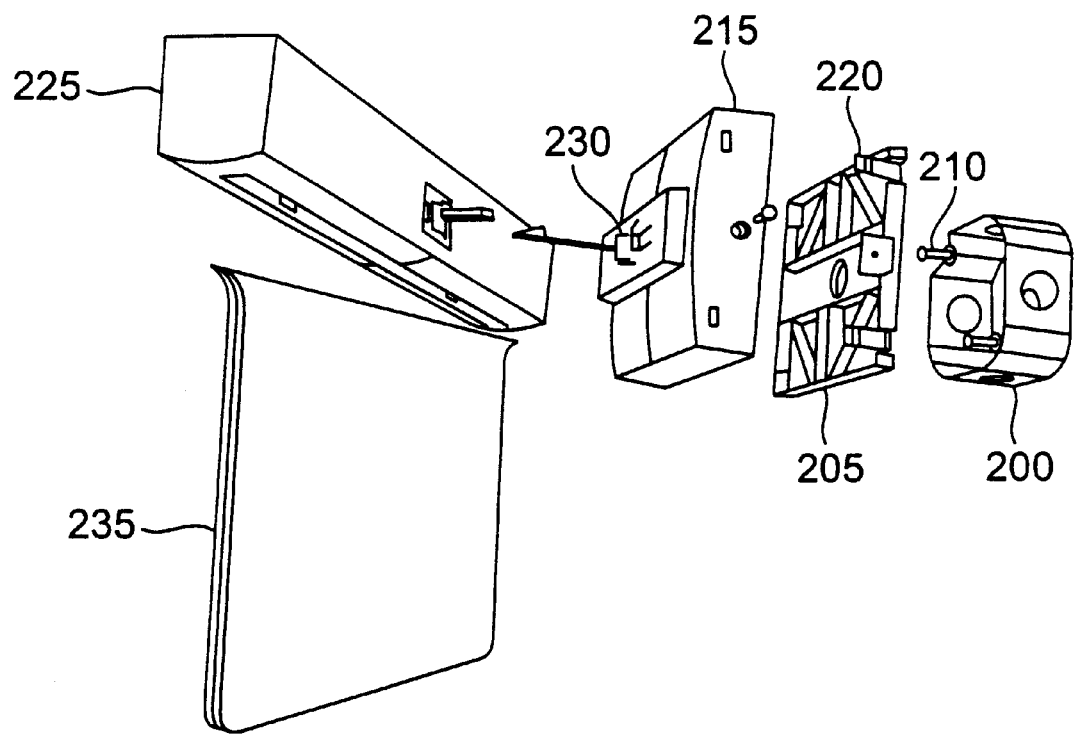
FIG. 4 is an exploded view of the fixture of FIG. 1 oriented to position the sign parallel to a wall.
Figure 5A:
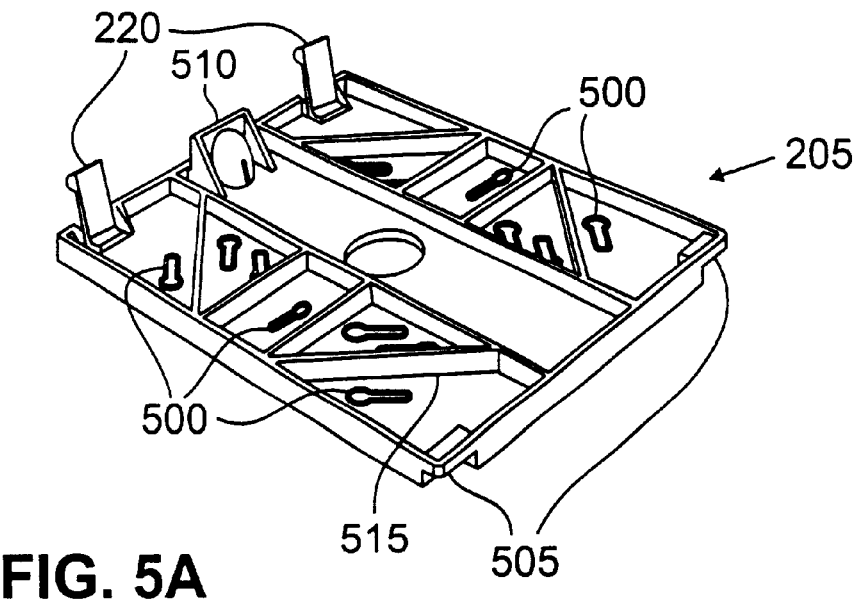
FIG. 5A is a perspective view of a mounting base of the fixture of FIG. 1.
Figure 5B:
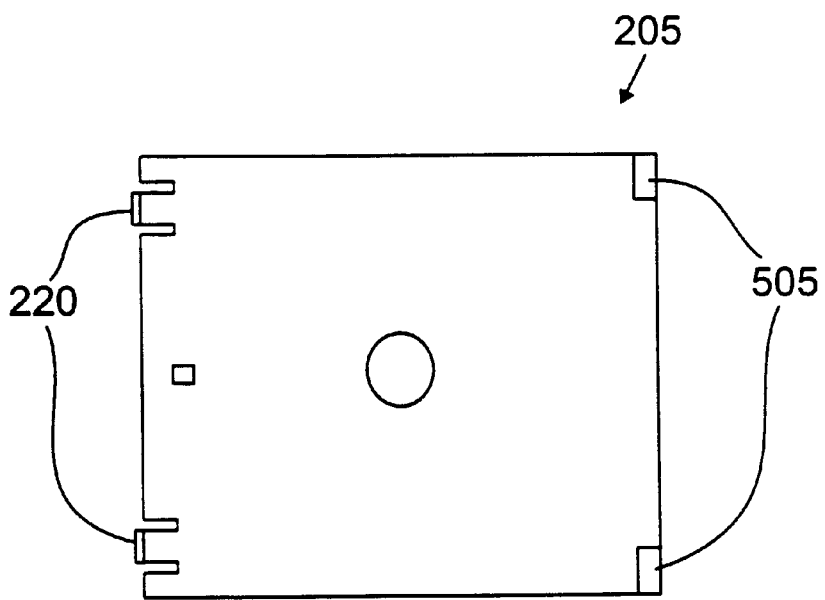
FIGS. 5B–5E are top, bottom, front and side views of the mounting base of FIG. 5A.
Figure 5C:
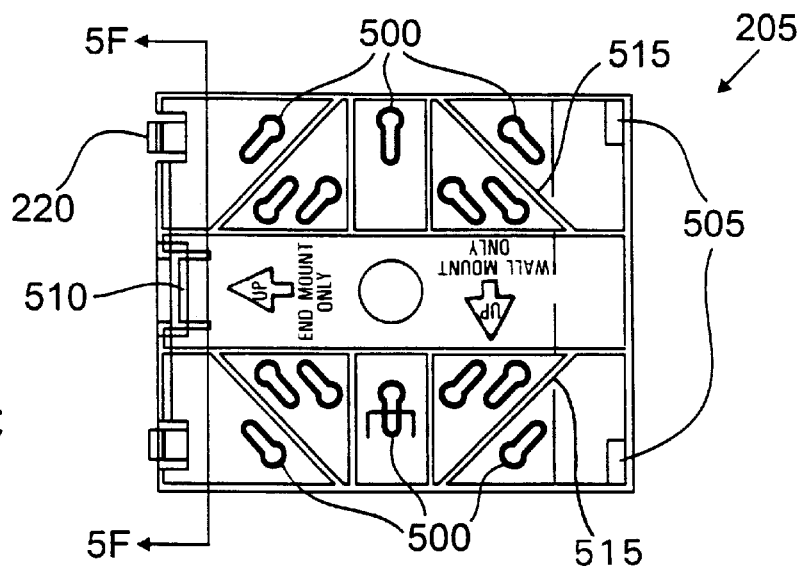
Figure 5D:
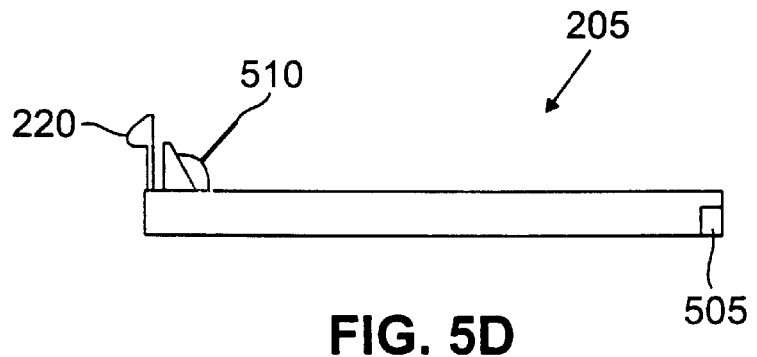
Figure 5E:
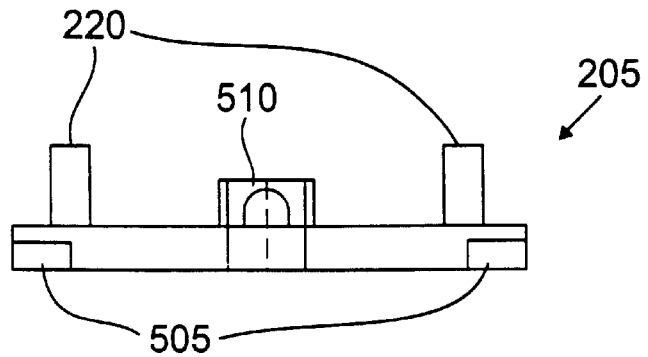
Figure 5F:
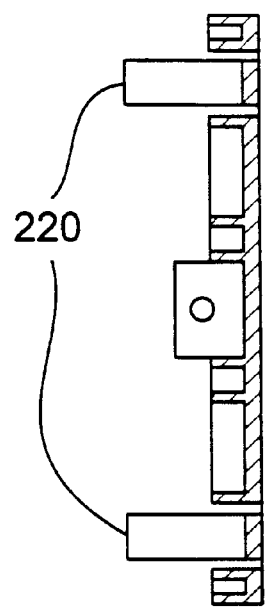
FIG. 5F is a sectional view of the mounting base of FIG. 5A taken along line 5F—5F of FIG. 5C.
Figure 6A:
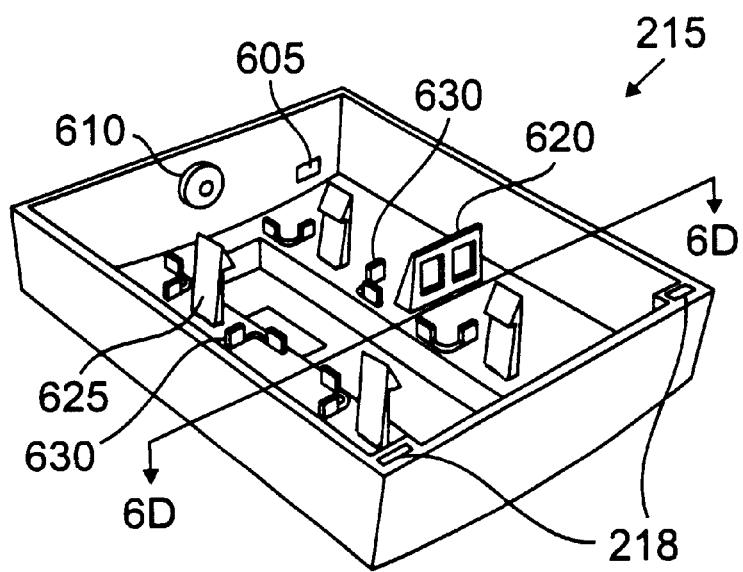
FIG. 6A is a perspective view of a canopy of the fixture of FIG. 1.
Figure 6B:
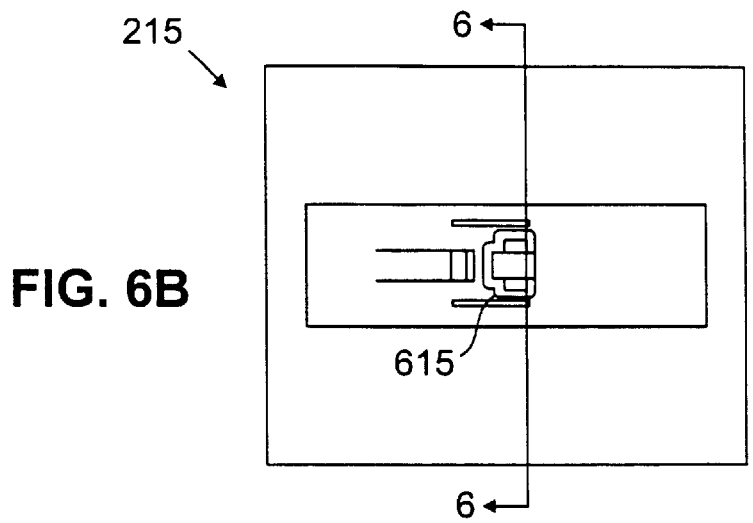
FIGS. 6B and 6C are top and bottom views of the canopy of FIG. 6A.
Figure 6C:
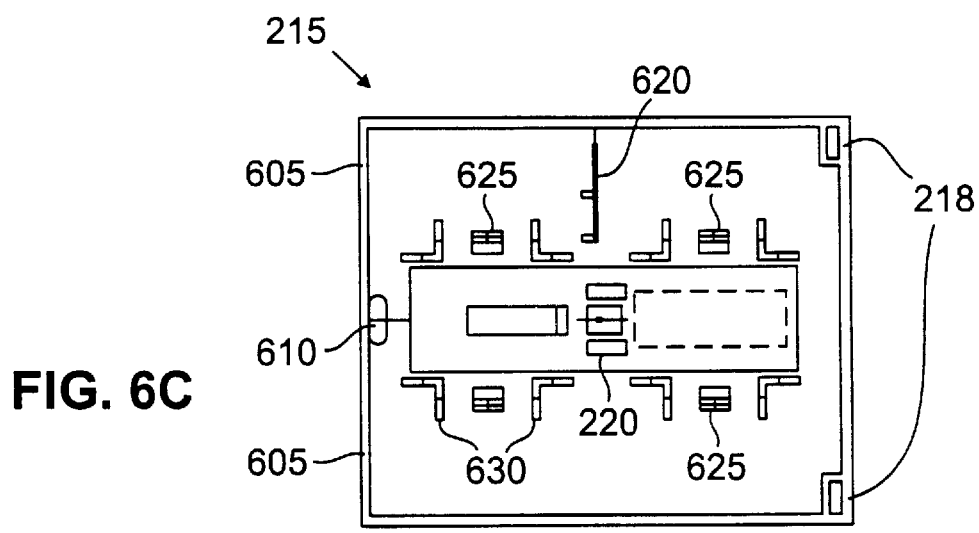
Figure 6D:
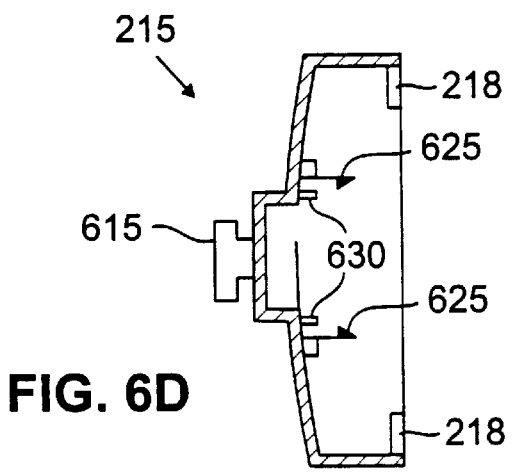
FIG. 6D is a sectional view of the canopy of FIG. 6A taken along line 6D—6D of FIG. 6B.
Figure 7A:
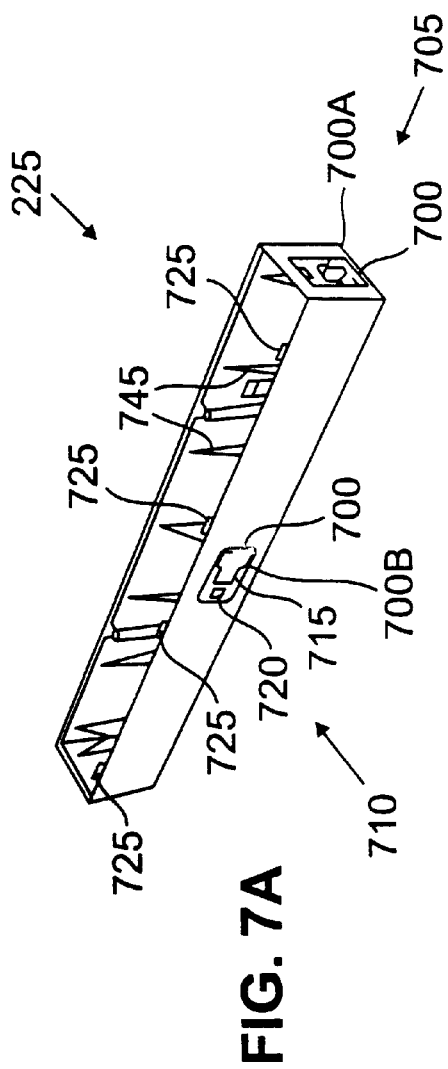
FIG. 7A is a perspective view of a housing of the fixture of FIG. 1.
Figure 7B:
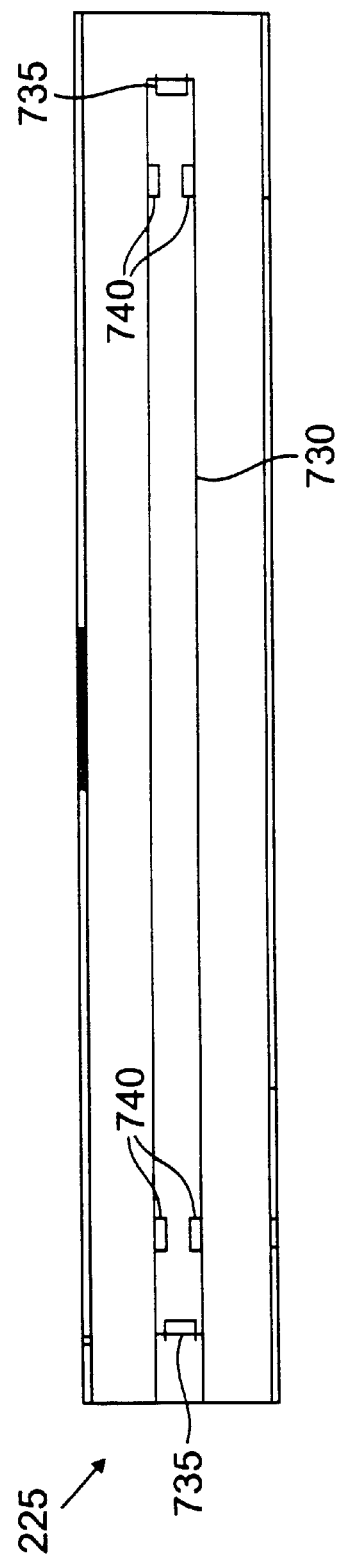

Referring to FIG. 1, an exit fixture 100 may be secured to a wall or on a ceiling. As best shown in FIGS. 2–4, the fixture attaches to a junction box 200 which provides electrical power and further provides a stable connection point for the fixture. A mounting base 205 of the fixture 100 is attached to junction box 200 by screws 210. A canopy 215 is attached to the mounting base 205 by tabs 218 (FIG. 6A) and latches 220. A housing 225 is attached to the canopy 215 by a locking T-connector 230. A cover 232 (FIG. 8A) closes the housing 225. The housing 225 can be end-mounted, as shown in FIGS. 1 and 2; ceiling-mounted, as shown in FIG. 3; or side-mounted, as shown in FIG. 4. Once the housing 225 is connected to the canopy 215, a lens panel 235 is attached to the housing 225 by a snap fit. Different lens panels with different backings are available for the fixture.

Referring to FIGS. 5A–5E, the mounting base 205 includes attachment points 500 to which the junction box screws 210 attach. The mounting base 205 also includes two latches 220 and two tab indentations 505 that secure the canopy 215 to the mounting base 205. The mounting base 205 also includes a screw receptacle 510 that receives a canopy screw (not shown). The canopy screw ensures a secure mounting of the canopy 215 on the mounting base 205. Structural reinforcements 515 serve to strengthen the mounting base 205.

Referring to FIGS. 6A-6D, the canopy 215 is attached to the mounting base 205 by latches 220 and tabs 218. To fasten the canopy 215 to the mounting base 205, the canopy 215 is tilted and the two tabs 218 are slipped underneath the tab indentations 505 of the mounting base 205. Once the tabs 218 and tab indentations 505 are aligned, the latches 220 are depressed and the canopy 215 is pushed toward the mounting base 205 until the latches 220 snap into latch holes 605 on the canopy. Once the canopy 215 is in place, a canopy screw (not shown) is screwed into a screw hole 610 in the canopy, and then into the screw receptacle 510 for the mounting base. The screw ensures that the canopy 215 will not separate from the mounting base 205. The latches 220 are made from resilient material to ensure that the latches 220 remain in the latch holes 605.

The canopy 215 is attached to the housing 225 by a locking T-connector 230. The male end 615 of the locking T connector 230 is on the canopy 215. The interior of the canopy also includes a wiring mount 620, as well as four mounting arms 625 and alignment structures 630 for use in securing a backup power supply (e.g., a battery unit) within the canopy.

Referring to FIGS. 7A–7E, the housing 225 includes two female ends 700 of the locking T-connector 230, with a first female end 700A being located on the end 705 of the housing to provide an end-mounted configuration, and a second female end 700B being located on a side 710 of the housing to provide a side-mounted configuration. The female end 700 of the locking T-connector 230 includes a larger T-shaped hole 715 and a smaller rectangular hole 720.

Figure 8A:
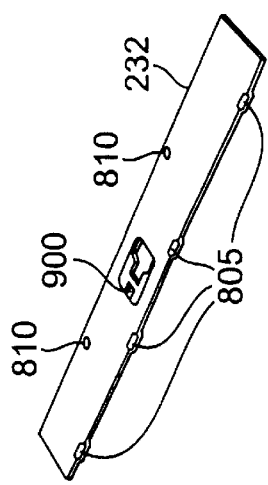
FIG. 8A is a perspective view of a cover of the housing of FIG. 7A

The housing 225 also connects to the cover 232 (FIG. 8A) and the lens panel 235. The housing 225 includes four tabs 725 for connection to the cover 232 (FIG. 8A). The housing 225 includes a slot 730, two retaining tabs 735, and four lens stops 740 for connection to the lens panel 235. The housing also includes structural reinforcements 745.

Figure 8B:
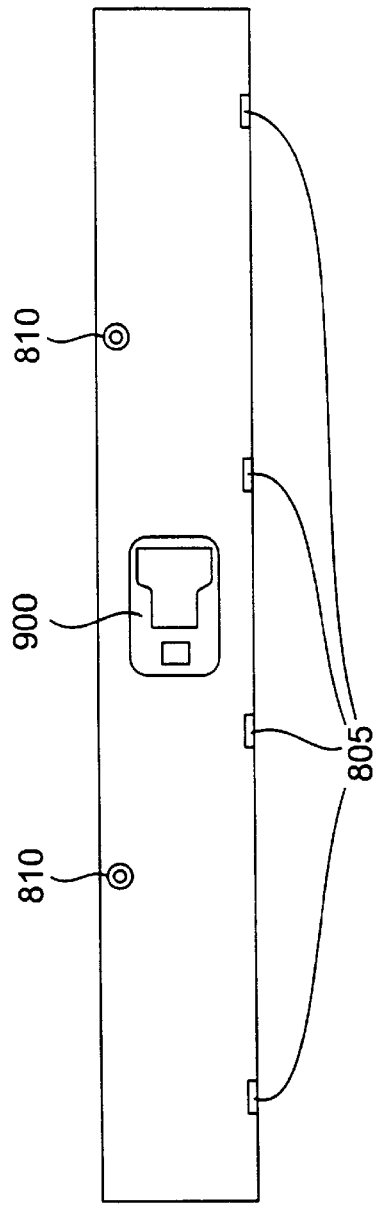
FIG. 8B and 8C are bottom and top views of the cover of FIG. 8A.
Figure 8C:
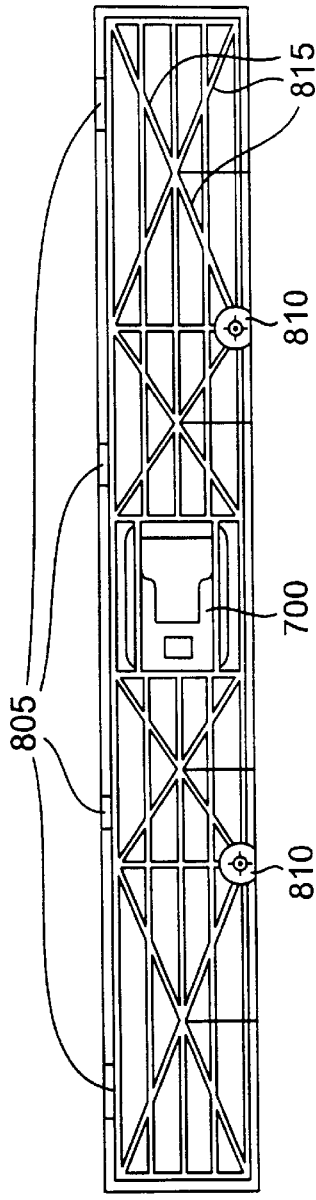

Referring to FIGS. 8A-8C, the cover 232 includes four tab indentations 805, a female end 700 of a locking T-connector 230 (for providing a ceiling-mounted configuration), and two screw holes 810. To fasten the cover 232 to the housing 225, the cover 232 is tilted and the four tab indentations 805 are slipped underneath the four tabs 725 of the housing 225. The cover 232 is then snapped into place. Once the cover 232 is in place, two screws are placed in the screw holes 810 to ensure the cover 232 does not separate from the housing 225. The cover also includes structural reinforcement 815.

Figure 9A:
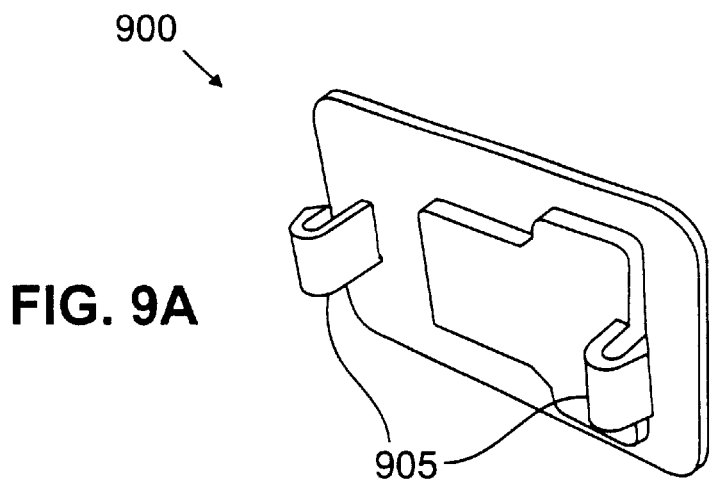
FIG. 9A is a perspective view of a plug.
Figure 9B:
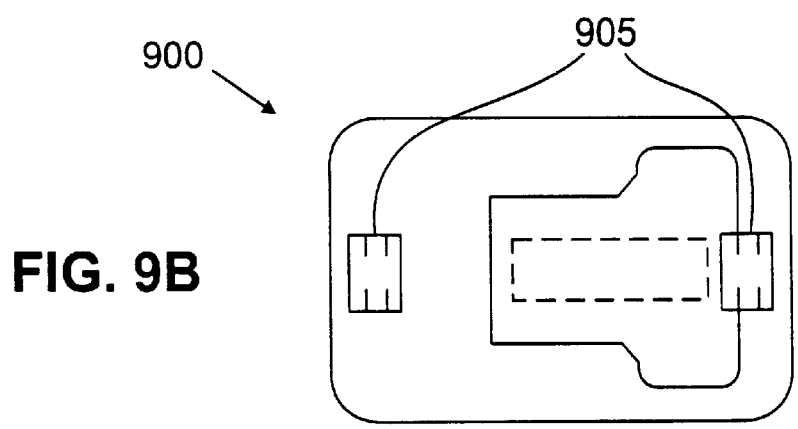
FIG. 9B and 9C are top and side views of the plug of FIG. 9A.
Figure 9C:
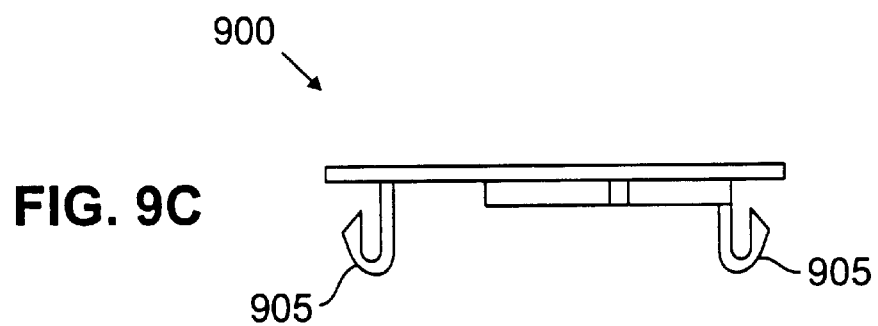

Referring to FIGS. 9A–9C, a plug 900 is used to cover an unused female end 700 of a locking T-connector 230. As noted the T-connector female ends are on either the cover 232 or the housing 225. The plug 900 includes two plastic hooks 905 which pass through the two holes 715 and 720 of the female end 700 and lock into place. When inserted, the plug 900 provides a flush cover over the female end 700.

Figure 10:
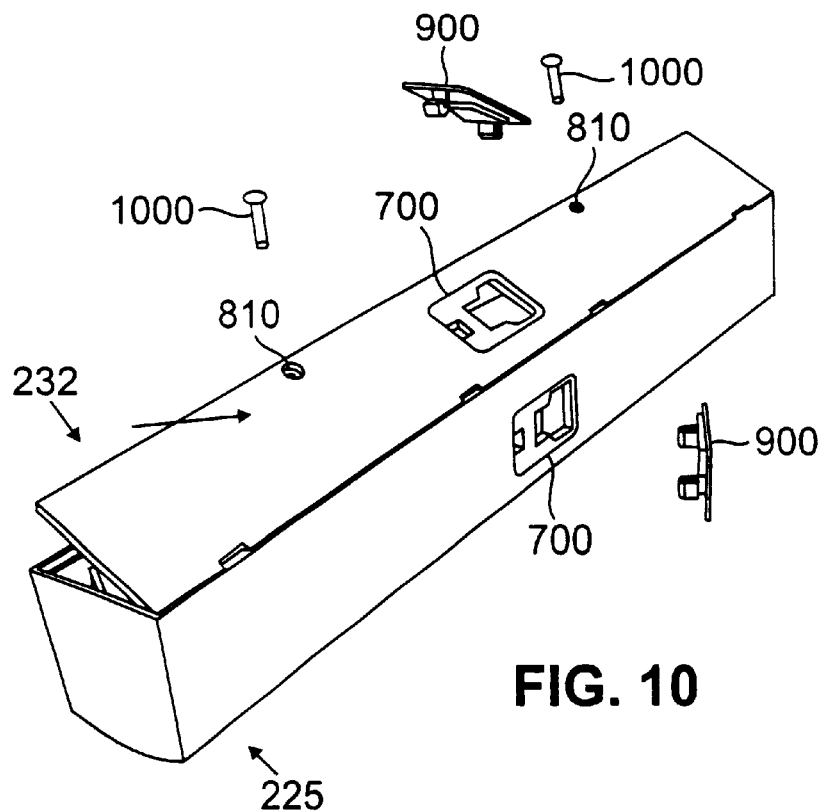
FIG. 10 is a perspective view of the cover of FIG. 8A being placed on the housing of FIG. 7A and the positioning of two plugs from FIG. 9A.

FIG. 10 shows the cover 232 installed on the housing 225 with the plugs 900 being inserted into the unused female ends 700. Screws 1000 secure the cover 232 in place.

Figure 11:
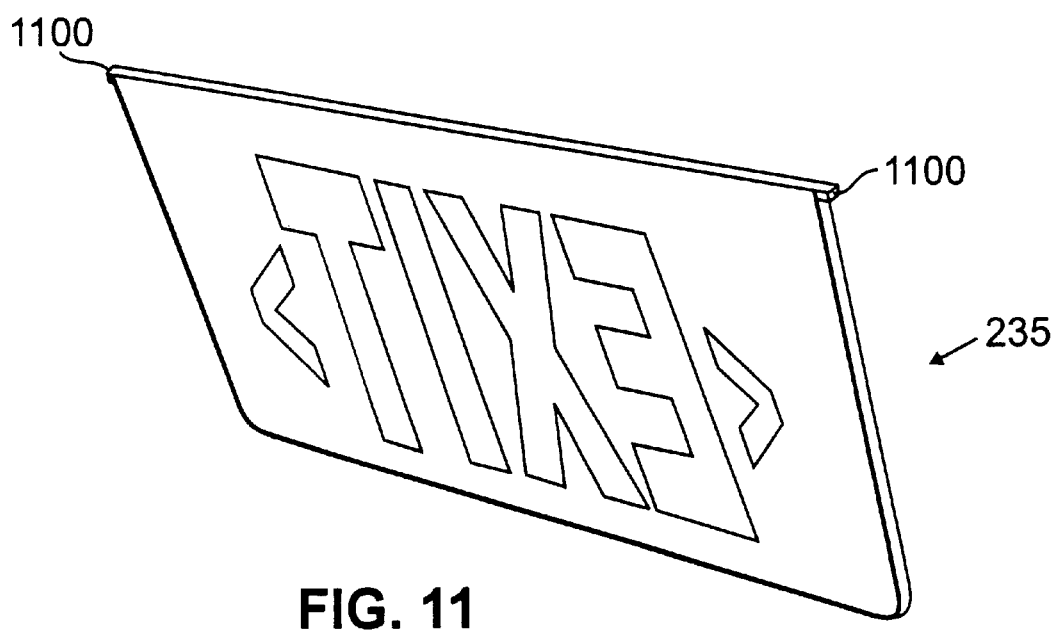
FIG. 11 is a perspective view of a lens panel of the fixture of FIG. 1.

Referring to FIG. 11A, the lens panel 235 snaps into place in the slot 730 of the housing 225 and is held in place by the two retaining tabs 735. The lens panel 235 is inserted until it hits the lens stops 740. When inserted into place, the tabs 1100 on the top of the lens panel 235 are positioned above the retaining tabs 735 of the housing 225. The retaining tabs 735 are made of a resilient material to allow insertion of the lens panel 235. The lens panel 235 is also constructed to permit illumination of the edges of the sign and the letters or symbols displayed on the sign.

Figure 12A:
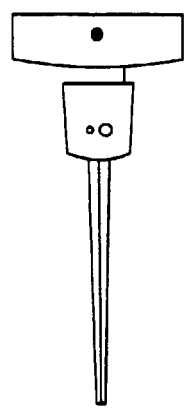
FIGS. 12A–12C are end views of a ceiling mount configuration, an end mount configuration, and a wall mount configuration for the fixture of FIG. 1.
Figure 12B:
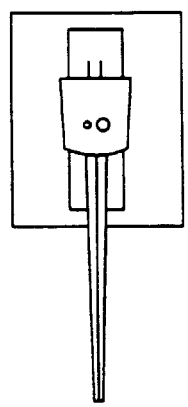
Figure 12C:
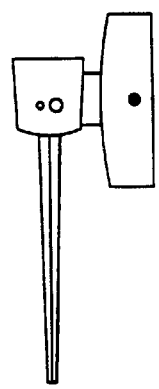

FIGS. 12A–12C show the three different mounting configurations possible with the fixture. FIG. 12A shows an end view of a ceiling-mounted fixture, FIG. 12B shows an end view of an end-mounted fixture, and FIG. 12C shows an end view of a side-mounted fixture.

Figure 13A:
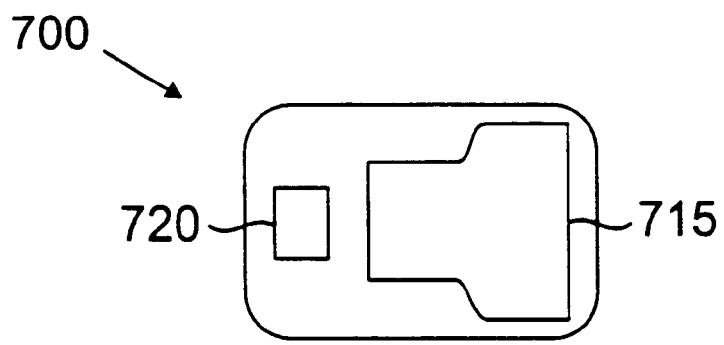
FIGS. 13A and 13B are enlarged views of a female end and a male end of a locking T-connector which connects the canopy to the housing.
Figure 13B:
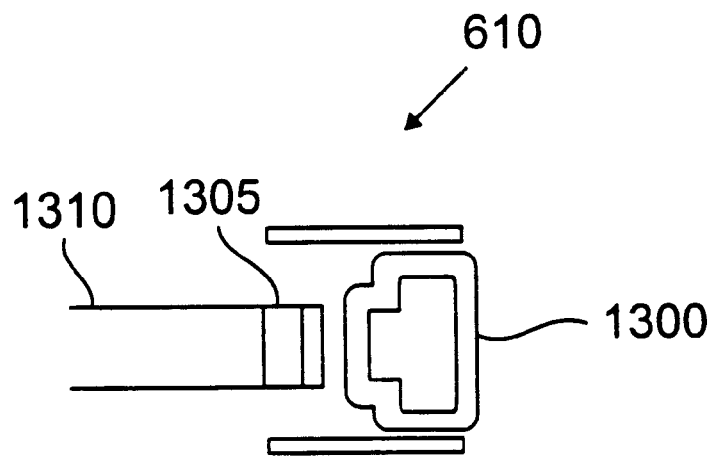

FIGS. 13A and 13B illustrate a locking T-connector 230, with FIG. 13A showing the female end 700 and FIG. 13B showing the male end 615. To connect the male end 615 of the T-connector 230 with the female end 700, the raised T-portion 1300 of the male end 615 is inserted into the larger T-shaped hole 715. The canopy 215, which includes the male end 615, is then slid in the direction of the smaller hole 720 of the female end 700 of the T-connector until the ends snap together. The connection is locked into place by the locking mechanism 1305 of the locking bar 1310, which snaps into place in the smaller hole 720 of the female end 700 of the T-connector. The resilience of the locking bar 1310 keeps the locking mechanism 1305 in place. To disassemble the T-connector, the locking bar 1310 is pulled so that the locking mechanism 1305 is removed from the smaller hole 910. The canopy 215 then is slid away from the smaller hole 720.

Figure 14:
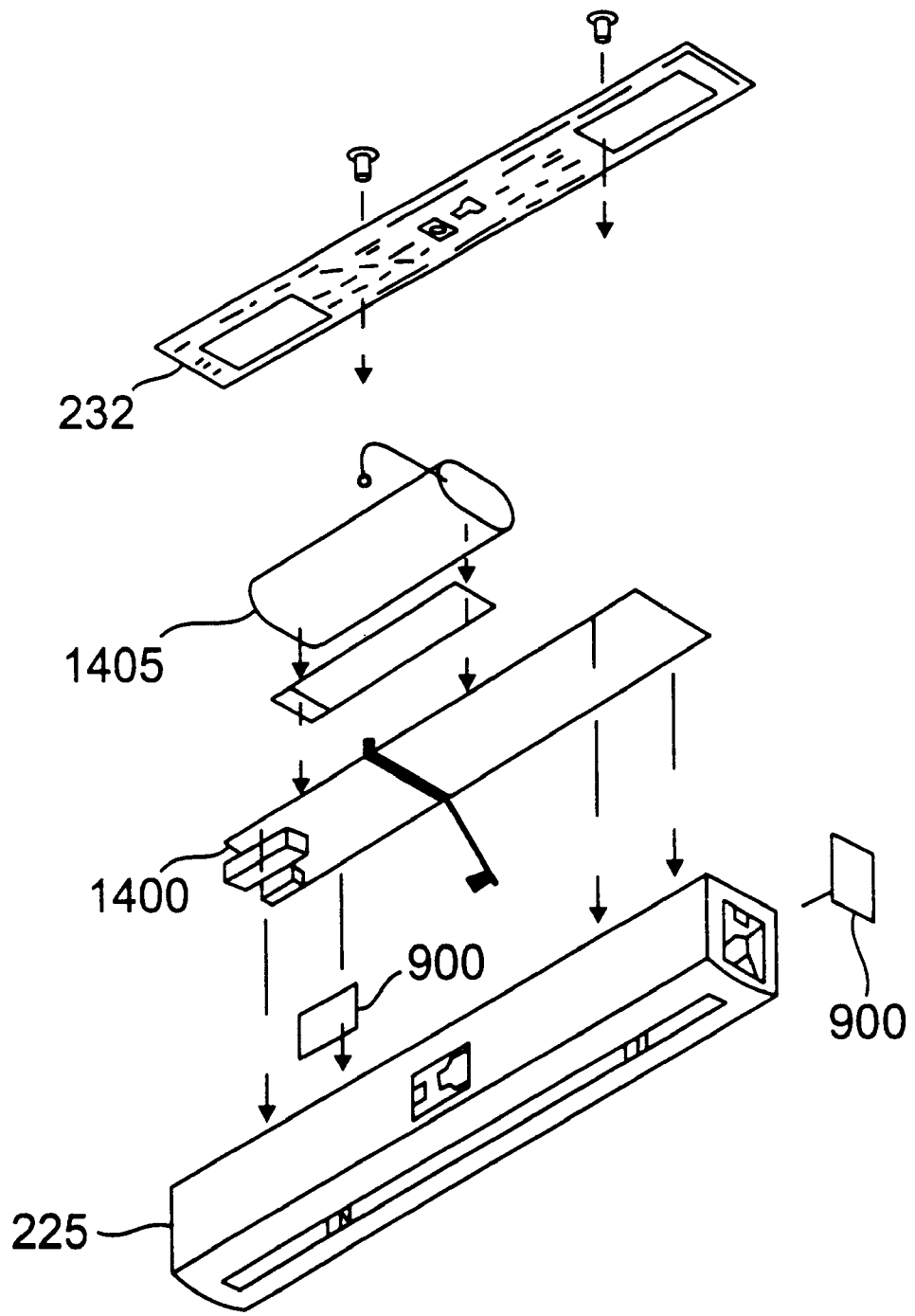
FIG. 14 is an exploded view of the housing of FIG. 7A, its internal components, the plugs of FIG. 9A, and the cover of FIG. 8A.

Referring to FIG. 14, a circuit board 1400 positioned inside the housing 225 provides illumination for the lens panel 235. A battery 1405 can also be placed in the housing 225 to provide illumination when primary power is interrupted. The cover 232 is used to close the open side of the housing 225.

Figure 15:
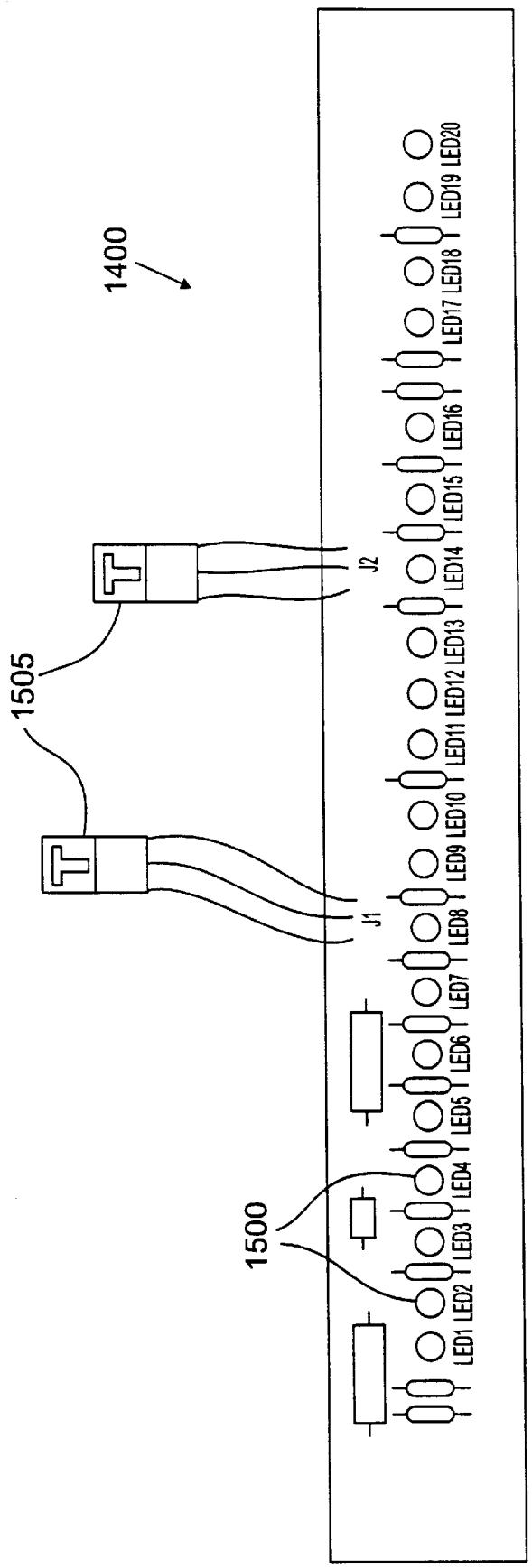
FIG. 15 is top view of a circuit board used to illuminate the sign.

Referring to FIG. 15, the circuit board 1400 includes a set of light emitting diodes (LEDs) 1500. The LEDs 1500 are illuminated when the circuit board 1400 is connected to a power source using a connector 1505.

Figure 16B:
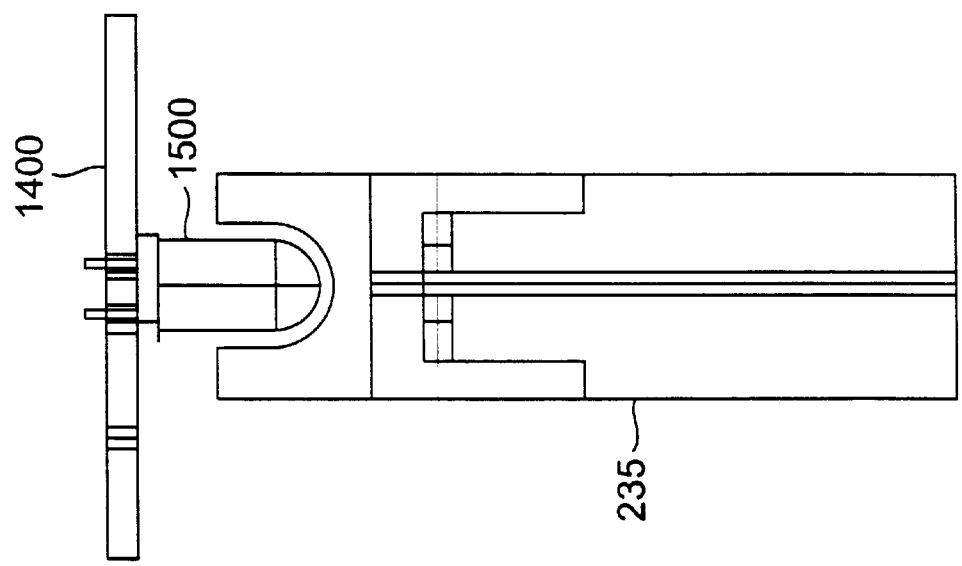
FIGS. 16B–16D are enlarged views showing possible orientations between the light source and the lens panel of the fixture of FIG. 1.
Figure 16A:
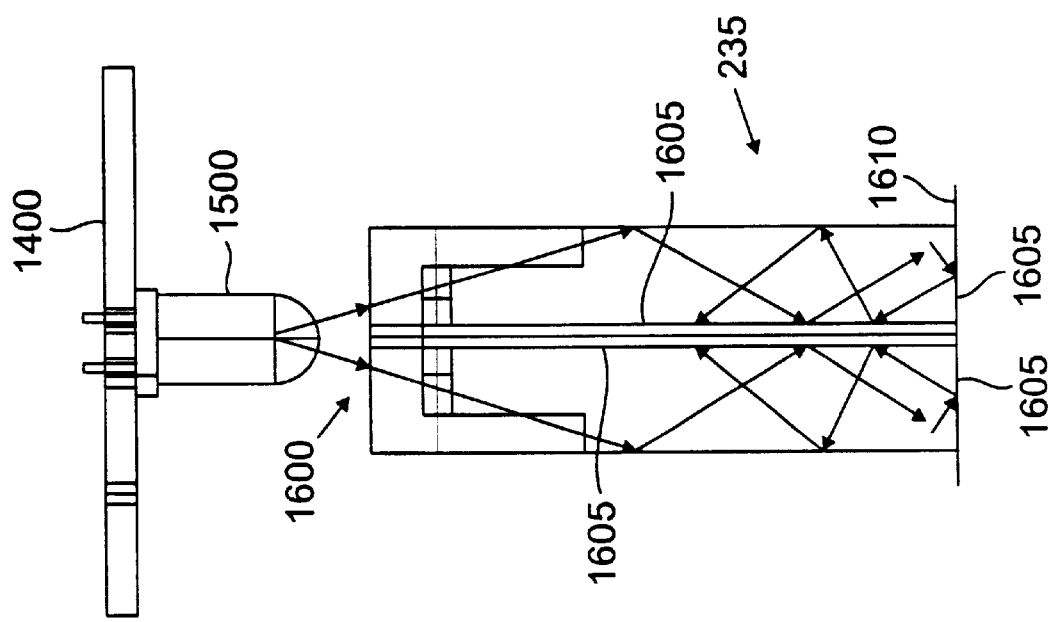
FIG. 16A is a side view of a lens panel and light source of the fixture of FIG. 1.

As shown in FIG. 16A, the light from the illuminated LEDs 1500 is channeled through an opening 1600 in the lens panel 235 to illuminate the edges of the lens panel 235 as well as the letters, numbers or symbols appearing on the panel. The lens panel 235 includes reflective material 1605 inside the lens panel 235 and reflective material 1605 on the edges 1610 of the lens panel 235. The light emitted from the LEDs may travel along many different paths before exiting from a face of the lens panel 235. A portion of the light from the LEDs will travel directly to the face of the lens panel 235. Other light from the LEDs will be reflected by the reflective material in the center of the lens panel 235 before reaching a face of the lens panel 235. Still other light may be reflected by the reflective material along the edges of the lens panel 235 before reaching a face of the lens panel 235. The face of the lens panel 235 is ultimately illuminated by the sum of the light travelling along the different paths to the face of the lens panel 235.

Figure 16D:
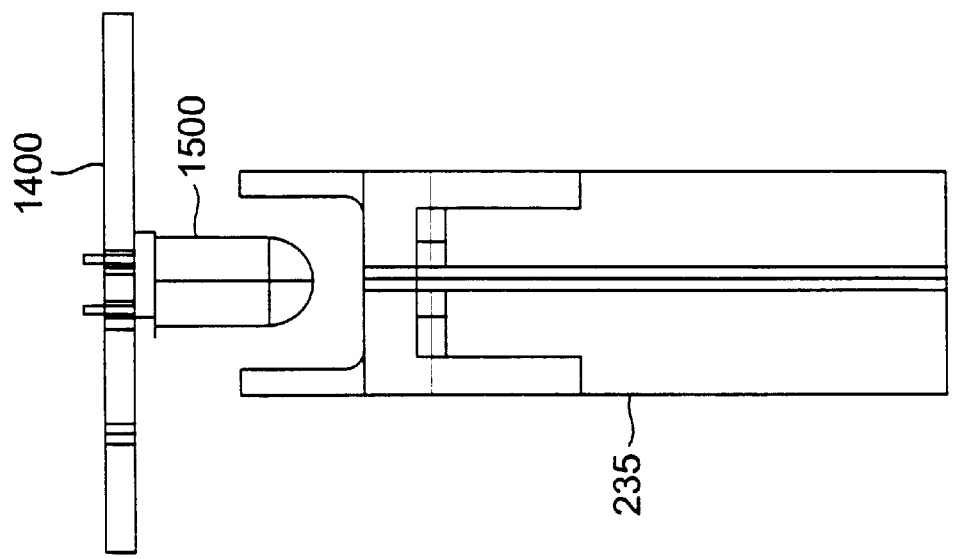
Figure 16C:
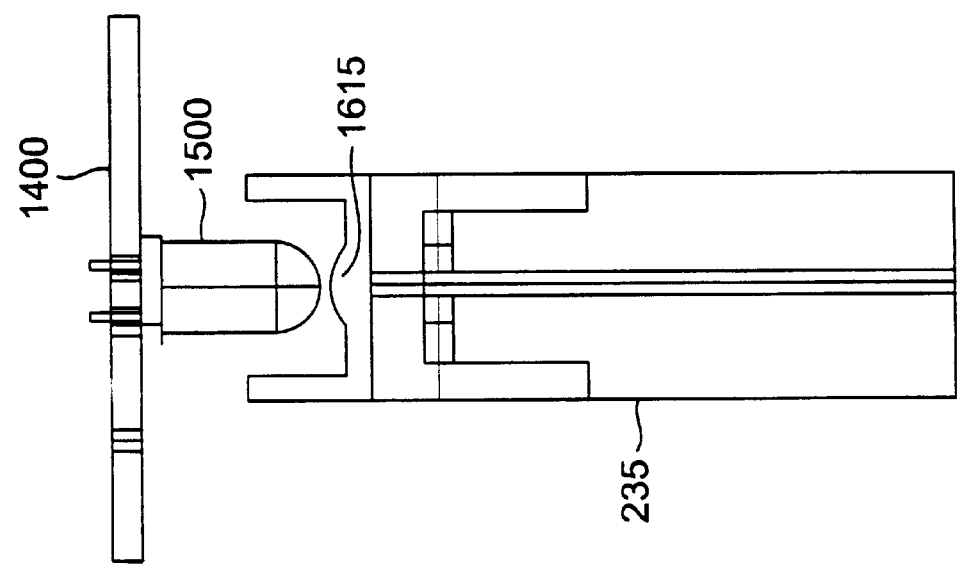

As shown in FIGS. 16B–16D, other interfaces between the LEDs 1500 and the edge of the lens panel may also be used. FIG. 16B illustrates an edge of the lens panel whose contour matches the shape of the LEDs 1500. This interface captures more of the light from the LEDs and channels it into the lens panel 235.

FIG. 16C illustrates a third interface between the LEDs 1500 and the edge of the lens panel 235. The generally rectangular receiving area along the edge of the lens panel 235 receives light from the LEDs 1500 at different angles than the previous orientations. The bubble shape 1615 along the bottom of the rectangular groove in the receiving area of the edge of the lens panel increases the amount of light that is directed to the reflective material 1605 in the center of the lens panel 235.

FIG. 16D illustrates a fourth interface between the LEDs 1500 and the edge of the lens panel 235. This configuration combines a portion of the contour shape included in FIG. 16B with the generally rectangular shape of the interface of FIG. 16C. This combination increase the amount of light which enters the edge of the lens panel 235 while increasing the amount of light available for reflection within the lens panel 235. The various interfaces between the LEDs 1500 and the edge of the lens panel 235 can be used to maximize the effectiveness of the exit sign for varying conditions.

Other embodiments are within the scope of the following claims.

What is claimed is:

1. A fixture comprising:
    a mounting unit including attachment points for attachment to a junction box and also including a connector;
    a housing unit including at least two mating connectors positioned at different locations for attachment to the connector, and further including an exterior slot;
    a light source positioned in the housing unit and oriented to direct light through the slot; and
    a lens panel including a first face, a second face opposite the first face, and an edge defined between the faces and sized to be received in the slot, wherein light from the light source provides lighted indicia on at least the first face of the lens panel and
    wherein the connector comprises one of a male connector and a female connector, the mating connectors comprise the other of the male connector and the female connector, the female connector includes first and second holes, and the male connector includes a raised portion and a locking bar, whereby the female connector and the male connector are locked together by inserting the raised portion in the first hole and sliding the connectors relative to each other until the locking bar engages the second hole.

2. The fixture of claim 1, wherein the housing unit comprises a first mating connector positioned on an end of the housing unit to permit attachment of the housing unit to the mounting unit with the end of the housing unit adjacent to the mounting unit.

3. The fixture of claim 2, wherein the housing unit comprises a second mating connector positioned on a side of the housing unit to permit attachment of the housing unit to the mounting unit with the side of the housing unit adjacent to the mounting unit.

4. The fixture of claim 3, wherein the housing unit comprises a third mating connector positioned on a top of the housing unit to permit attachment of the housing unit to the mounting unit with the top of the housing unit adjacent to the mounting unit.

5. The fixture of claim 4, wherein the end of the housing unit is perpendicular to the side of the housing unit, and the top of the housing unit is perpendicular to the end and side of the housing unit.

6. The fixture of claim 4, wherein the lens panel is removably attached to a bottom of the housing unit.

7. The fixture of claim 1, further comprising reflective material positioned to direct light to the first face of the lens panel.

8. The fixture of claim 7, wherein the reflective material is positioned between the faces and generally parallel to the faces.

9. The fixture of claim 8, wherein the reflective material includes a first reflective surface positioned to direct light to the first face and a second reflective surface positioned to direct light to the second face.

10. The fixture of claim 1, wherein the light source comprises LEDs.

11. The fixture of claim 10, wherein the edge defined between the faces of the lens panel and sized to be received in the slot of the housing unit includes a contour to generally match a shape of the LEDs.

12. The fixture of claim 10, wherein the edge defined between the faces of the lens panel and sized to be received in the slot of the housing unit includes a generally rectangular receiving area with a convex, semi-circular center section.

13. The fixture of claim 10, wherein the edge defined between the faces of the lens panel and sized to be received in the slot of the housing unit includes a generally rectangular receiving area with contoured sides.

14. The fixture of claim 10, wherein the light source comprises a single row of LEDs positioned to illuminate both faces of the lens panel.

15. The fixture of claim 1, wherein the lens panel comprises a sign.

16. The fixture of claim 4, wherein the housing unit comprises a housing body and a housing cover, with the housing cover positioned on top of the housing unit and the third mating connector included in the housing cover.

17. The fixture of claim 4, wherein the housing unit comprises plugs positioned in unused ones of the mating connectors.

18. The fixture of claim 17, wherein each plug defines a surface flush with a surface of the housing unit.

19. The fixture of claim 4, wherein the connector includes a locking mechanism.

20. The fixture of claim 1, wherein the lens panel is attached to a bottom of the housing unit.

21. The fixture of claim 1, wherein the housing unit comprises plugs positioned in unused ones of the mating connectors.

22. The fixture of claim 1, wherein the first hole comprises a T-shaped hole and the raised portion comprises a T-shaped portion.

23. The fixture of claim 1, wherein the connector comprises the male connector.

24. The fixture of claim 1, wherein the mounting unit comprises a first component including the attachment points and a canopy secured to the first component and including the connector of the mounting unit.

25. A fixture comprising:
    a mounting unit including a connector; and
    a housing unit including
        a first mating connector positioned on an end of the housing unit to permit attachment of the housing unit to the mounting unit with the end of the housing unit adjacent to the mounting unit, a second mating connector positioned on a side of the housing unit to permit attachment of the housing unit to the mounting unit with the side of the housing unit adjacent to the mounting unit, and a third mating connector positioned on a top of the housing unit to pert attachment of the housing unit to the mounting unit with the top of the housing unit adjacent to the mounting unit, wherein the end of the housing unit is generally perpendicular to the side of the housing unit, and the top of the housing unit is generally perpendicular to the end and the side of the housing unit.

26. A lighting fixture comprising:

a Counting base including attachment points for attachment to a junction box;

a canopy connected to the mounting base, configured to a around and enclose at least a portion of he mount se and including a connector;

a housing unit including a first mating connector positioned on an end of the housing unit to permit attachment of the housing unit to the mounting base with the end of the housing unit adjacent to the mounting base and a second mating connector positioned on a side of the housing unit to permit attachment of the housing unit to the mounting base with the side of the housing unit adjacent to the mounting base;

a lens panel extending from a bottom of the housing unit, and a light source positioned in the housing unit.

27. The light fixture of claim 26, further comprising a cover attached to a top of the housing unit, the cover including a third mating connector to permit attachment of the housing unit to the mounting base with the cover adjacent to the mounting base.

28. A fixture comprising:

a mounting unit including attachment points for attachment to a structural support and also including a connector; and a housing unit including at least one mating connector for attachment to the connector; wherein:

the connector comprises one of a male connector and a female connector;

the mating connector comprises the other of the male connector and the female connector, the female connector includes first and second holes, and the male connector includes a raised portion and a flexible locking bar having a locking mechanism on at least one end of the locking bar, whereby the female connector and male connector are locked together by inserting the raised portion into the first hole in one direction and sliding the connectors relative to each other in another direction until the locking mechanism of the locking bar engages the second hole.

29. The fixture of claim 28, wherein the first hole comprises a T-shaped hole and the raised portion comprises a T-shaped portion.

30. The fixture of claim 28, wherein the connector of the mounting comprises the male connector.

* * * * *

UNITED STATES PATENT AND TRADEMARK OFFICE
CERTIFICATE OF CORRECTION

| | | |
|---|---|---|
| PATENT NO. | : 6,241,369 B1 | Page 1 of 1 |
| APPLICATION NO. | : 09/196785 | |
| DATED | : June 5, 2001 | |
| INVENTOR(S) | : Edwin Thomas Mackiewicz | |

It is certified that error appears in the above-identified patent and that said Letters Patent is hereby corrected as shown below:

In the Claims:

Column 6, in claim 19, line 1, after "connector" insert --of the mounting unit--.

Column 6, in claim 23, line 1, after "connector" insert --of the mounting unit--.

Columns 6-7, in claim 25, line 13, replace "pert" with --permit--.

Column 7, in claim 26, line 2, replace "Counting" with --mounting--.

Column 7, in claim 26, line 4, after "configured to" replace "a" with --fit--.

Column 7, in claim 26, line 5, replace "he mount se" with --the mounting base,--.

Column 7, in claim 26, line 15, replace "unit," with --unit;--.

Column 8, in claim 30, line 2, after "mounting" insert --unit--.

Signed and Sealed this

Nineteenth Day of February, 2008

JON W. DUDAS
*Director of the United States Patent and Trademark Office*